US012559586B2

(12) United States Patent
Latorre Martinez et al.

(10) Patent No.: US 12,559,586 B2
(45) Date of Patent: Feb. 24, 2026

(54) COMPOSITIONS CONTAINING URETDIONE GROUPS CROSSLINKING AT LOW TEMPERATURES

(71) Applicant: Covestro Deutschland AG, Leverkusen (DE)

(72) Inventors: Irene Cristina Latorre Martinez, Leverkusen (DE); Hans-Josef Laas, Odenthal (DE); Raul Pires, Cologne (DE); Laura Woods, Düsseldorf (DE); Ralph-Georg Born, Remscheid (DE); Florian Golling, Dortmund (DE)

(73) Assignee: Covestro Deutschland AG, Leverkusen (DE)

( * ) Notice: Subject to any disclaimer, the term of this patent is extended or adjusted under 35 U.S.C. 154(b) by 697 days.

(21) Appl. No.: 17/998,713

(22) PCT Filed: May 25, 2021

(86) PCT No.: PCT/EP2021/063787

§ 371 (c)(1),
(2) Date: Nov. 14, 2022

(87) PCT Pub. No.: WO2021/239678

PCT Pub. Date: Dec. 2, 2021

(65) Prior Publication Data

US 2023/0192941 A1 Jun. 22, 2023

(30) Foreign Application Priority Data

May 29, 2020 (EP) .................................... 20177419

(51) Int. Cl.
*C08G 18/79* (2006.01)
*C08G 18/10* (2006.01)
(Continued)

(52) U.S. Cl.
CPC .......... *C08G 18/798* (2013.01); *C08G 18/10* (2013.01); *C08G 18/2027* (2013.01);
(Continued)

(58) Field of Classification Search
CPC .. C08G 18/798; C08G 18/10; C08G 18/2063; C08G 18/4236; C08G 2150/00; C08G 18/2027; C08L 75/06; C09D 175/06
See application file for complete search history.

(56) References Cited

U.S. PATENT DOCUMENTS

| | | | |
|---|---|---|---|
| 3,640,967 | A | 2/1972 | Konig et al. |
| 3,923,743 | A | 12/1975 | Quiring et al. |

(Continued)

FOREIGN PATENT DOCUMENTS

| | | | |
|---|---|---|---|
| DE | 1078568 | B | 3/1960 |
| DE | 2414413 | A1 | 10/1975 |

(Continued)

OTHER PUBLICATIONS

Welton, T., "Room-Temperature Ionic Liquids. Solvents for Synthesis and Catalysis," Chemical Reviews, vol. 99, Issue 8, Jul. 1999, pp. 2071-2084.

(Continued)

*Primary Examiner* — Rabon A Sergent
(74) *Attorney, Agent, or Firm* — The Webb Law Firm

(57) ABSTRACT

The invention relates to compositions containing A) at least one component having at least one uretdione group, B) at least one component having at least one hydroxyl group, C1) of at least one catalyst, containing a structural element of the general formula (I) and/or (II), wherein $R^1$, $R^2$, $R^3$, $R^4$, $R^5$ and $R^6$ independently of each other represent the same or different radicals meaning saturated or unsaturated, linear or branched, aliphatic, cycloaliphatic, araliphatic or aromatic organic radicals with 1 to 18 carbon atoms that are substituted or unsubstituted and/or have heteroatoms in the chain, the radicals being capable of forming, even when combined with each other and optionally together with an additional heteroatom, rings with 3 to 8 carbon atoms that can optionally be further substituted, wherein $R^3$, $R^4$, $R^5$ and $R^6$ independently of each other can also represent hydrogen, and $R^7$ represents hydrogen or a carboxylate anion (COO−), and C2) at least one catalyst containing at least one N,N,N'-trisubstituted amidine structure and having an amidine group content (calculated as CN2; molecular weight=40) of 12.0 to 47.0 wt.-%. General formulas (I) and (II):

(I)

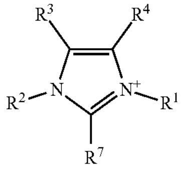

(II)

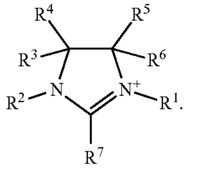

20 Claims, No Drawings

(51) Int. Cl.

| | |
|---|---|
| ***C08G 18/20*** | (2006.01) |
| ***C08G 18/42*** | (2006.01) |
| ***C08L 75/06*** | (2006.01) |
| ***C09D 175/06*** | (2006.01) |

(52) U.S. Cl.

CPC ..... *C08G 18/2063* (2013.01); *C08G 18/4236* (2013.01); *C08L 75/06* (2013.01); *C09D 175/06* (2013.01); *C08G 2150/00* (2013.01)

(56) References Cited

U.S. PATENT DOCUMENTS

| | | | |
|---|---|---|---|
| 3,996,223 | A | 12/1976 | Gupta et al. |
| 4,001,232 | A | 1/1977 | Groegler et al. |
| 4,044,171 | A | 8/1977 | Muller et al. |
| 4,255,569 | A | 3/1981 | Mueller et al. |
| 4,413,079 | A | 11/1983 | Disteldorf et al. |
| 4,463,154 | A | 7/1984 | Pisteldorf et al. |
| 4,483,798 | A | 11/1984 | Disteldorf et al. |
| 4,837,359 | A | 6/1989 | Woynar et al. |
| 4,960,848 | A | 10/1990 | Scholl et al. |
| 4,994,541 | A | 2/1991 | Dell et al. |
| 5,064,960 | A | 11/1991 | Pedain et al. |
| 5,076,958 | A | 12/1991 | Pedain et al. |
| 5,126,170 | A | 6/1992 | Zwiener et al. |
| 5,502,147 | A | 3/1996 | Nodelman et al. |
| 5,621,064 | A | 4/1997 | Laas et al. |
| 5,723,605 | A | 3/1998 | Werbitzky et al. |
| 5,750,629 | A | 5/1998 | Laas et al. |
| 5,814,689 | A | 9/1998 | Goldstein et al. |
| 5,847,044 | A | 12/1998 | Laas et al. |
| 5,914,383 | A | 6/1999 | Richter et al. |
| 6,613,861 | B2 | 9/2003 | Gras |
| 6,730,768 | B2 | 5/2004 | Heidbreder et al. |
| 6,914,115 | B2 | 7/2005 | Spyrou et al. |
| 7,019,088 | B1 | 3/2006 | Lehmann et al. |
| 7,307,135 | B2 | 12/2007 | Spyrou |
| 7,572,876 | B2 | 8/2009 | Spyrou et al. |
| 7,858,802 | B2 | 12/2010 | Maase et al. |
| 9,080,074 | B2 | 7/2015 | Shaffer et al. |
| 9,963,538 | B2 | 5/2018 | Schaefer et al. |
| 2004/0219367 | A1 | 11/2004 | Spyrou et al. |
| 2007/0066786 | A1 | 3/2007 | Hanson, Jr. et al. |
| 2007/0266897 | A1 | 11/2007 | Spyrou |
| 2012/0245241 | A1 | 9/2012 | Peiffer et al. |
| 2015/0232609 | A1 | 8/2015 | Spyrou et al. |
| 2021/0009850 | A1* | 1/2021 | Laas .................... C09D 175/06 |
| 2022/0251280 | A1 | 8/2022 | Laas et al. |

FOREIGN PATENT DOCUMENTS

| | | | |
|---|---|---|---|
| DE | 19701835 | A1 | 7/1998 |
| EP | 0601079 | A1 | 6/1994 |
| EP | 0689556 | A1 | 1/1996 |
| EP | 0978523 | A1 | 2/2000 |
| GB | 1121924 | A | 7/1968 |
| GB | 1145952 | A | 3/1969 |
| GB | 1244416 | A | 9/1971 |
| GB | 1534258 | A | 11/1978 |
| WO | 9107452 | A1 | 5/1991 |
| WO | 2011124710 | A1 | 10/2011 |

OTHER PUBLICATIONS

Bredereck et al., “Saureamid-Reaktionen, XLVI: Synthese von N.N.N'-Trimethyl-formamidin und Bis-dimethylamino-methoxy-methan (Aminalester),” Chemische Berichte, vol. 98, Issue 4, Apr. 1965, pp. 1078-1080.

Hirose et al., “Effect of anion in carboxylate-based ionic liquids on catalytic activity of transesterification with vinyl esters and the solubility of cellulose,” RSC Advances, vol. 9, Issue 7, 2019, pp. 4048-4053.

International Search Report in PCT/EP2021/063787, mailed Aug. 26, 2021, Authorized officer: Martin Sütterlin.

Laas et al., “Zur Synthese aliphatischer Polyisocyanate—Lackpolyisocyanate mit Biuret-, Isocyanurat-oder Uretdionstruktur,” Journal fur Praktische Chemie/Chemiker-Zeitung, vol. 336, Issue 3, 1994, pp. 185-200.

Meerwein et al., “Die Polymerisation des Tetrahydrofurans,” Angewandte Chemie, vol. 72, Issue 24, Dec. 1960, pp. 927-934.

Richter, R., “Die Addition aromatischer Isocyanate an N-substituierte Amidine,” Chemische Berichte, vol. 101, Issue 9, Sep. 1968, pp. 3002-3009.

Siefken, W., “Mono- und Polyisocyanate IV. Mitteilung über Polyurethane,” Justus Liebigs Annalen der Chemie, vol. 562, Issue 2, Apr. 1949, pp. 75-136.

* cited by examiner

COMPOSITIONS CONTAINING URETDIONE GROUPS CROSSLINKING AT LOW TEMPERATURES

CROSS-REFERENCE TO RELATED APPLICATIONS

This application is a national stage application under 35 U.S.C. 371 of PCT/EP2021/063787, filed May 25, 2021, which claims the benefit of European application no. 20177419.7, filed May 29, 2020, each of which is incorporated herein by reference.

DETAILED DESCRIPTION

The present invention relates to uretdione-containing compositions and to the use of these compositions for producing polyurethane plastics or coatings. The invention further relates to coating formulations containing the compositions and to substrates coated with the coating formulation.

Uretdione-containing polyaddition products are already known as crosslinker components for thermally crosslinkable polyurethane (PUR) coating and adhesive compositions. In these products the crosslinking principle is the thermal ring opening of the uretdione groups to afford isocyanurate groups and the reaction thereof with a hydroxy-functional or amino-functional binder.

Uretdione-containing crosslinkers are nowadays used almost exclusively for producing donor-free polyurethane (PUR) powder coatings (for example DE-A 2 312 391, DE-A 2 420 475, EP-A 0 045 994, EP-A 0 045 996, EP-A 0 045 998, EP-A 0 639 598 or EP-A 0 669 353). The use of uretdione-containing polyurethanes as crosslinker components for solvent-containing or aqueous one-component systems has likewise already been described (for example WO 99/11690, WO 2014/053269), inter alia due to the comparatively low reactivity of the internally blocked isocyanate groups present in the form of uretdione structures which in combination with polyols generally require baking temperatures of at least 160° C., but such systems have not hitherto succeeded in establishing themselves in the market.

There has been no lack of attempts to lower the curing temperatures of uretdione-containing coating systems through use of suitable catalysts. Various compounds have already been proposed for this purpose, for example the organometallic catalysts known from polyurethane chemistry, such as tin(II) acetate, tin(II) octoate, tin(II) ethylcaproate, tin(II) laurate, dibutyltin diacetate, dibutyltin dilaurate, dibutyltin maleate (for example EP-A 0 045 994, EP-A 0 045 998, EP-A 0 601 079, WO 91/07452 or DE-A 2 420 475), iron (III) chloride, zinc chloride, zinc 2-ethylcaproate and molybdenum glycolate, tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane and N,N'-dimethylpiperazine (for example EP-A 0 639 598) or N,N,N'-trisubstituted amidines, in particular bicyclic amidines, such as 1,5-diazabicyclo[4.3.0]non-5-ene (DBN) and 1,8-diazabicyclo[5.4.0]undec-7ene (DBU) (for example EP-A 0 803 524 or WO 2011/115669).

Of these catalysts the recited bicyclic amidines allow the lowest baking temperatures. However, they also result in a degree of yellowing that is unacceptable for many fields of application.

EP-A 1 137 689 teaches that Lewis acid catalysts such as for example the abovementioned tin or zinc compounds are inhibited by acidic groups such as for example carboxyl groups. They can therefore only develop their full catalytic activity in a uretdione system when the employed hydroxy-functional binder is free from carboxyl groups. This is achievable for example by simultaneous addition of a sufficient amount of a carboxyl-reactive agent, for example a carbodiimide or an epoxide.

In the absence of carboxyl groups or with co-use of a carboxyl-reactive compound suitable catalysts also include quaternary ammonium hydroxides and ammonium fluorides (for example EP-A 1 334 987), ammonium carboxylates (for example EP-A 1 475 399, EP-A 1 522 547), phosphonium hydroxides, alkoxides or carboxylates (for example WO 2005/085315) or metal hydroxides and alkoxides (for example EP-A 1 475 400) which allow the curing temperature of uretdione systems to be markedly reduced.

The applicant's own published patent application EP 19185846.3, now also published as US 2022/0251280A1, provides for the use of special salts having an imidazolium or dihydroimidazolium structure as catalysts for lowering the curing temperature of uretdione systems. The use of these catalysts ensures practically complete reaction of uretdiones with alcohols and/or thiols to afford allophanate/thioallophanate structures even in the temperature range from 80° C. to 100° C., wherein subordinate amounts of isocyanurate structures may also form. However, due to the very high reactivity, coatings produced using uretdione systems catalyzed in this way exhibit only moderate optical properties, in particular a flow which is insufficient for many applications.

It is accordingly an object of the present invention to provide novel uretdione systems which likewise undergo very complete curing at very low temperatures while producing coatings with flow properties that are markedly improved compared to the prior art.

This object is achieved by providing the catalyzed uretdione-containing compositions more particularly described hereinbelow.

The present invention is based on the surprising observation that uretdione-containing coating systems which contain special catalyst combinations of imidazolium salts and amidine bases undergo complete crosslinking in a very low temperature range to afford coatings films which exhibit a markedly higher hardness and especially much improved flow compared to those cured using only one of these respective catalyst types.

The present invention provides compositions containing

A) at least one component comprising at least one uretdione group,

B) at least one component comprising at least one hydroxyl group,

C1) at least one catalyst comprising a structural element of general formulae (I) and/or (I)

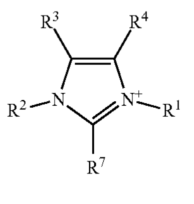

-continued (II)

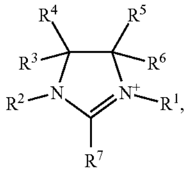

in which $R^1$, $R^2$, $R^3$, $R^4$, $R^5$ and $R^6$ independently of one another stand for identical or different radicals which represent saturated or unsaturated, linear or branched, aliphatic, cycloaliphatic, araliphatic or aromatic organic radicals having 1 to 18 carbon atoms which are substituted or unsubstituted and/or have heteroatoms in the chain, wherein the radicals may also in combination with one another and optionally with a further heteroatom form rings having 3 to 8 carbon atoms which may optionally be further substituted, wherein $R^3$, $R^4$, $R^5$ and $R^6$ may independently of one another also represent hydrogen and $R^7$ represents hydrogen or a carboxylate anion ($COO^-$), and C2) at least one catalyst comprising at least one N,N,N'-trisubstituted amidine structure and having an amidine group content (calculated as $CN_2$; molecular weight=40) of 12.0% to 40.0% by weight.

According to the invention, the references to “comprising”, “containing”, etc. preferably mean “consisting essentially of” and most preferably “consisting of”. The further embodiments identified in the claims and in the description can be combined arbitrarily, provided the context does not clearly indicate that the opposite is the case.

The uretdione-containing component A) is selected from any desired, optionally isocyanate-functional uretdione-containing compounds A1) such as are obtainable by methods known per se, for example by oligomerization of monomeric isocyanates, and/or polyaddition compounds A2) obtainable by reaction of isocyanate-functional uretdione-containing compounds A1) with alcohols and/or amines.

An “organic compound” or “organic radical” comprises at least one unit comprising a covalent carbon-hydrogen bond.

The term “aliphatic” is presently defined as meaning non-aromatic hydrocarbon groups that are saturated or unsaturated.

The term “araliphatic” is presently defined as meaning hydrocarbon radicals consisting of both an aromatic hydrocarbon radical and a saturated or unsaturated hydrocarbon group which is bonded directly to the aromatic radical.

The term “alicyclic” or “cycloaliphatic” is presently defined as meaning optionally substituted carbocyclic or heterocyclic compounds or units which are not aromatic (for example cycloalkanes, cycloalkenes or oxa-, thia-, aza- or thiazacycloalkanes). Particular examples are cyclohexyl groups, cyclopentyl groups and their N- or O-heterocyclic derivatives such as for example pyrimidine, pyrazine, tetrahydropyran or tetrahydrofuran.

In the event that the groups or compounds are disclosed as “optionally substituted” or “substituted” suitable substituents are —F, —Cl, —Br, —I, —OH, —$OCH_3$, —$OCH_2CH_3$, —O-isopropyl or —O-npropyl, —$OCF_3$, —$CF_3$, —S—$C_{1-6}$-alkyl and/or (optionally via a pendant heteroatom) a linear or branched aliphatic and/or alicyclic structural unit having 1 to 12 carbon atoms which in each case functions as a substitute for a carbon-bonded hydrogen atom of the respective molecule. Preferred substituents are halogen (especially —F, —Cl), $C_{1-6}$-alkoxy (especially methoxy and ethoxy), hydroxy, trifluoromethyl and trifluoromethoxy which in each case function as a substitute for a carbon-bonded hydrogen atom of the respective molecule.

In a first preferred embodiment the component A) is selected from isocyanate-functional uretdione-containing compounds A1) and/or polyaddition compounds A2) obtainable by reaction of isocyanate-functional uretdione-containing compounds A1) with alcohols and/or amines.

Suitable isocyanates for producing the uretdione-containing compounds A1) are any mono-, di-, and triisocyanates having aliphatically, cycloaliphatically, araliphatically and/or aromatically bonded isocyanate groups obtainable in various ways, for example by phosgenation in the liquid or gas phase or by a phosgene-free route, for example by thermal urethane cleavage.

Preferred monoisocyanates are those in the molecular weight range 99 to 300, for example n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- and 4-methylcyclohexyl isocyanate, benzyl isocyanate, phenyl isocyanate or naphthyl isocyanate.

Preferred diisocyanates are those in the molecular weight range 140 to 400, for example 1,4-diisocyanatobutane, 1,5-diisocyanatopentane (pentamethylene diisocyanate, PDI), 1,6-diisocyanatohexane (hexamethylene diisocyanate, HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis(isocyanatomethyl) cyclohexane, 1,3-diisocyanato-2(4)-methylcyclohexane, 1-isocyanato-3,3,5-trimethyl-5-isocyanatomethylcyclohexane (isophorone diisocyanate, IPDI), 2,4'- and 4,4'-diisocyanatodicyclohexylmethane ($H_{12}$-MDI), 4,4'-diisocyanato-3,3'-dimethyldicyclohexyl methane, 4,4'-diisocyanato-3,3',5,5'-tetramethyldicyclohexylmethane, 4,4'-diisocyanato-1,1'-bicyclohexyl, 4,4'-diisocyanato-3,3'-dimethyl-1,1'-bicyclohexyl, 4,4'-diisocyanato-2,2',5,5'-tetramethyl-1,1'-bicyclohexyl, 1,8-diisocyanato-p-menthane, 1,3-diisocyanatoadamantane, 1,3-dimethyl-5,7-diisocyanatoadamantane, 1-isocyanato-1-methyl-4(3)-isocyanatomethylcyclohexane, bis(isocyanatomethyl) norbornane (NBDI), 1,3- and 1,4-bis(isocyanatomethyl) benzene (xylylene diisocyanate, XDI), 1,3- and 1,4-bis(2-isocyanatopropan-2-yl)benzene (tetramethylxylylene diisocyanate, TMXDI), 1,3-bis(isocyanatomethyl)-4-methylbenzene, 1,3-bis(isocyanatomethyl)-4-ethylbenzene, 1,3-bis(isocyanatomethyl)-5-methylbenzene, 1,3-bis(isocyanatomethyl)-4,5-dimethylbenzene, 1,4-bis (isocyanatomethyl)-2,5-dimethylbenzene, 1,4-bis (isocyanatomethyl)-2,3,5,6-tetramethylbenzene, 1,3-bis (isocyanatomethyl)-5-tert-butylbenzene, 1,3-bis (isocyanatomethyl)-4-chlorobenzene, 1,3-bis (isocyanatomethyl)-4,5-dichlorobenzene, 1,3-bis (isocyanatomethyl)-2,4,5,6-tetrachlorobenzene, 1,4-bis (isocyanatomethyl)-2,3,5,6-tetrachlorobenzene, 1,4-bis (isocyanatomethyl)-2,3,5,6-tetrabromobenzene, 1,4-bis(2-isocyanatoethyl)benzene and 1,4-bis(isocyanatomethyl) naphthalene, 1,2-, 1,3-, and 1,4-diisocyanatobenzene (phenylene diisocyanate), 2,4- and 2,6-diisocyanatotoluene (tolylene diisocyanate, TDI), 2,3,5,6-tetramethyl-1,4-diisocyanatobenzene, the isomeric diethylphenylene diisocyanates, diisopropylphenylene diisocyanates, diisododecylphenylene diisocyanates, and biphenyl diisocyanates, 3,3'-dimethoxybiphenyl 4,4'-diisocyanate, 2,2'-, 2,4'- and 4,4'-diisocyanatodiphenylmethane (MDI), 3,3'-dimethyldiphenylmethane 4,4'-diisocyanate, 4,4'-diisocyanatodiphenylethane, 1,5-diisocyanatonaphthalene (naphthylene diisocyanate, NDI), diphenyl ether diisocyanate, ethylene glycol diphenyl ether diisocyanate, diethylene glycol diphenyl ether diisocyanate, 1,3-propylene glycol diphenyl ether diisocyanate, benzophenone diisocyanate, triisocyanatobenzene, 2,4,6-triisocyanatotoluene, trimethylbenzene triisocyanate, diphenylmethane 2,4,4'-triisocyanate, 3-methyldiphenylmethane 4,6,4'-triisocyanate, the isomeric naphthalene triisocyanates and methylnaphthalene diisocyanates, triphenylmethane triisocyanate or 2,4-diisocyanato-1-[(5-isocyanato-2-methylphenyl)methyl]benzene.

Further diisocyanates that are likewise suitable may additionally be found for example in Justus Liebigs Annalen der Chemie, volume 562 (1949) pp. 75-136.

An example of a particularly suitable triisocyanate is 4-isocyanatomethyloctane 1,8-diisocyanate (triisocyanatononane; TIN).

Also employable for producing the uretdione-containing compounds A1) are mixtures of at least two such mono-, di-, and/or triisocyanates.

Preferably employed for producing the uretdione-containing components A1) are monomeric diisocyanates.

Particular preference is given to using PDI, HDI, IPDI, XDI, NBDI and/or $H_{12}$-MDI.

The production of the uretdione-containing compounds A1) may be carried out by various methods which are generally based on the customary processes known from the literature for oligomerization of simple diisocyanates, as described for example in J. Prakt. Chem. 336 (1994) 185-200, DE-A 16 70 666, DE-A 19 54 093, DE-A 24 14 413, DE-A 24 52 532, DE-A 26 41 380, DE-A 37 00 209, DE-A 39 00 053, DE-A 39 28 503, EP-A 336 205, EP-A 339 396 and EP-A 798 299.

The uretdione-containing compounds A1) may in the case of exclusive use or partial co-use of monoisocyanates be free from isocyanate groups. However, the production thereof preferably also employs at least di- and/or triisocyanates in amounts such that it affords uretdione-containing compounds A1) having an average NCO functionality of at least 1.6, preferably of 1.8 to 3.5, particularly preferably of 1.9 to 3.2, very particularly preferably of 2.0 to 2.7.

At average NCO functionalities of >2.0 these compounds A1) containing isocyanate-functional uretdione groups contain not only linear difunctional uretdione structures but also further, at least trifunctional, polyisocyanate molecules. These higher functional constituents of the compounds A1) are in particular the known reaction products of diisocyanates with an isocyanurate, allophanate, biuret, urethane and/or iminooxadiazinedione structure.

The uretdione-containing compounds A1) are generally freed of unreacted excess monomer immediately after their abovedescribed production by modification of simple monomeric mono-, di- and/or triisocyanates by known methods, for example by thin-film distillation or extraction. Said compounds therefore generally have residual contents of monomeric diisocyanates of less than 5% by weight, preferably less than 2% by weight, particularly preferably less than 1% by weight.

Irrespective of the chosen production processes the uretdione-containing compounds A1) generally have a content of uretdione structures (calculated as $C_2N_2O_2$, molecular weight=84) of 10% to 25% by weight, preferably of 12% to 23% by weight, particularly preferably of 14% to 20% by weight.

In a further preferred embodiment the component A1) is selected from uretdione-containing compounds based on PDI, HDI, IPDI, XDI, NBDI and/or $H_{12}$-MDI which preferably have an average NCO functionality of at least 1.6 and particularly preferably have a content of uretdione structures (calculated as $C_2N_2O_2$, molecular weight=84) of 10% to 25% by weight.

Likewise suitable as uretdione-containing component A) of the compositions according to the invention are polyaddition compounds A2), such as are obtainable by reaction of at least a portion of the free isocyanate groups of the above-described isocyanate-functional uretdione-containing compounds A1) with alcohols and/or amines.

Suitable alcohols for producing the polyaddition compounds A2) are for example simple aliphatic or cycloaliphatic monoalcohols, such as methanol, ethanol, n-propanol, isopropanol, n-butanol, isobutanol, sec-butanol, the isomeric pentanols, hexanols, octanols, and nonanols, n-decanol, n-dodecanol, n-tetradecanol, n-hexadecanol, n-octadecanol, cyclohexanol, the isomeric methylcyclohexanols and hydroxymethylcyclohexane, ether alcohols such as 2-methoxyethanol, 2-ethoxyethanol, 2-propoxyethanol, 2-butoxyethanol, diethylene glycol monomethyl ether, diethylene glycol monoethyl ether, diethylene glycol monobutyl ether, 3-methoxy-1-butanol and glycerol 1,3-diethyl ether, ester alcohols, such as hydroxyethyl acetate, butyl glycolate, ethyl lactate, glycerol diacetate or those that can be obtained by reacting the recited monoalcohols with lactones, or ether alcohols such as can be obtained by reacting the recited monoalcohols with alkylene oxides, in particular ethylene oxide and/or propylene oxide.

Alcohols suitable for producing the polyaddition compounds A2) likewise include any at least difunctional polyols in the molecular weight range 62 to 22 000, preferably those having an average functionality of 2 to 6 and a number average molecular weight of 62 to 18 000, particularly preferably an average functionality of 2 to 4 and a number average molecular weight of 90 to 12 000.

Suitable polyols for producing the polyaddition compounds A2) are for example simple polyhydric alcohols having 2 to 14, preferably 4 to 10, carbon atoms, for example ethane-1,2-diol, propane-1,2-diol and -1,3-diol, the isomeric butanediols, pentanediols, hexanediols, heptanediols and octanediols, nonane-1,9-diol, decane-1,10-diol, dodecane-1,12-diol, cyclohexane-1,2-diol and -1,4-diol, cyclohexane-1,4-dimethanol, 1,4-bis(2-hydroxyethoxy)benzene, 2,2-bis(4-hydroxyphenyl)propane (bisphenol A), 2,2-bis(4-hydroxycyclohexyl)propane (perhydrobisphenol), propane-1,2,3-triol, butane-1,2,4-triol, 1,1,1-trimethylolethane, hexane-1,2,6-triol, 1,1,1-trimethylolpropane (TMP), bis(2-hydroxyethyl)hydroquinone, 1,2,4- and 1,3,5-trihydroxycyclohexane, 1,3,5-tris(2-hydroxyethyl)isocyanurate, 3(4),8(9)-bis(hydroxymethyl)-tricyclo-[5.2.1.$0^{2,6}$]decane, di-trimethylolpropane, 2,2-bis(hydroxymethyl)propane-1,3-diol (pentaerythritol), 2,2,6,6-tetrakis(hydroxymethyl)-4-oxaheptane-1,7-diol (dipentaerythritol), mannitol or sorbitol, low-molecular-weight ether alcohols, for example diethylene glycol, triethylene glycol, tetraethylene glycol, dipropylene glycol or dibutylene glycol, or low-molecular-weight ester alcohols, for example neopentyl glycol hydroxypivalate.

Suitable polyols for producing the polyaddition compounds A2) also include the customary polymeric polyether polyols, polyester polyols, polycarbonate polyols, and/or polyacrylate polyols known from polyurethane chemistry, which typically have a number-average molecular weight of 200 to 22 000, preferably of 250 to 18 000, particularly preferably of 250 to 12 000. A broad overview of suitable polymeric polyols for producing the polyaddition compounds A2) may be found for example in N. Adam et al. Polyurethanes. In: *Ullmann's Encyclopedia of Industrial Chemistry*, Wiley-VCH Verlag GmbH & Co. KgaA; 2005. URL: https://doi.org/10.1002/14356007.a21_665.pub2. Suitable polyether polyols are for example those of the type the recited in DE 26 22 951 B, column 6, line 65 to column 7, line 26, EP-A 0 978 523, page 4, line 45 to page 5, line 14, or WO 2011/069966, page 4, line 20 to page 5, line 23 provided that they conform to the foregoing in respect of functionality and molecular weight. Particularly preferred polyether polyols are addition products of ethylene oxide and/or propylene oxide onto propane-1,2-diol, propane-1,3-diol, glycerol, trimethylolpropane, ethylenediamine and/or pentaerythritol or the polytetramethylene ether glycols having number-average molecular weights of 400 g/mol to 4000 g/mol obtainable for example according to Angew. Chem. 72, 927 (1960) (https://doi.org/10.1002/ange.19600722402) by polymerization of tetrahydrofuran.

Suitable polyester polyols include for example those of the type specified in EP-A 0 978 523, page 5, lines 17 to 47, or EP-A 0 659 792, page 6, lines 32 to 45, provided that they conform to the foregoing in respect of functionality and molecular weight. Particularly preferred polyester polyols are condensation products of polyhydric alcohols, for example ethane-1,2-diol, propane-1,2-diol, diethylene glycol, butane-1,4-diol, hexane-1,6-diol, neopentyl glycol, cyclohexane-1,4-dimethanol, cyclohexane-1,4-diol, perhydrobisphenol, 1,1,1-trimethylolpropane, propane-1,2,3-triol, pentaerythritol and/or sorbitol, with substoichiometric amounts of polybasic carboxylic acids or carboxylic anhydrides, for example succinic acid, adipic acid, sebacic acid, dodecanedioic acid, glutaric anhydride, maleic anhydride, phthalic anhydride, isophthalic acid, terephthalic acid, trimellitic acid, hexahydrophthalic anhydride and/or tetrahydrophthalic anhydride, or those as obtainable in a manner known per se from lactones, for example ε-caprolactone, and simple polyhydric alcohols, for example those mentioned above by way of example, as starter molecules with ring opening.

Suitable polycarbonate polyols include in particular the known-per-se reaction products of dihydric alcohols, for example those recited by way of example hereinabove in the list of the polyhydric alcohols, with diaryl carbonates, for example diphenyl carbonate, dimethyl carbonate or phosgene. Suitable polycarbonate polyols likewise include those that contain not only carbonate structures but also ester groups. These are, in particular, the polyestercarbonate diols, known per se, of the kind obtainable, for example, according to the teaching of DE-B 1 770 245 by reaction of dihydric alcohols with lactones, such as in particular ε-caprolactone, and subsequent reaction of the resulting polyester diols with diphenyl or dimethyl carbonate.

Suitable polyacrylate polyols include for example those of the type specified in WO 2011/124710 page 10, line 32 to page 13, line 18 provided that they meet the specifications made above in terms of functionality and molecular weight. Particularly preferred polyacrylate polyols include polymers/copolymers of hydroxyalkyl esters of acrylic acid or methacrylic acid, for example hydroxyethyl (meth)acrylate, hydroxypropyl (meth)acrylate or hydroxybutyl (meth)acrylate, optionally together with acrylic acid alkyl esters and/or methacrylic acid alkyl esters, for example methyl (meth)acrylate, ethyl (meth)acrylate, n-butyl (meth)acrylate, isobutyl (meth)acrylate, 2-ethylhexyl (meth)acrylate, cyclohexyl (meth)acrylate, isobornyl (meth)acrylate, lauryl (meth)acrylate, styrene or other copolymerizable olefinically unsaturated monomers, for example acrylic acid, methacrylic acid or dimethyl maleate.

Suitable polyols also include for example the known polyacetal polyols obtainable by reaction of simple glycols, for example diethylene glycol, triethylene glycol, 4,4'-dioxethoxydiphenyldimethylmethane (adduct of 2 mol of ethylene oxide onto bisphenol A) or hexanediol, with formaldehyde or else polyacetals produced by polycondensation of cyclic acetals, for example trioxane.

Suitable polyols for producing the polyaddition compounds A2) further include those described for example in EP-A 0 689 556 and EP-A 0 937 110, for example special polyols obtainable by reaction of epoxidized fatty acid esters with aliphatic or aromatic polyols to bring about epoxide ring opening as well as hydroxyl-containing polybutadienes.

Suitable amines for producing the polyaddition compounds A2) include for example simple aliphatic and cycloaliphatic monoamines, for example methylamine, ethylamine, n-propylamine, isopropylamine, the isomeric butylamines, pentylamines, hexylamines, and octylamines, n-dodecylamine, n-tetradecylamine, n-hexadecylamine, n-octadecylamine, cyclohexylamine, the isomeric methylcyclohexylamines and also aminomethylcyclohexane, secondary monoamines such as dimethylamine, diethylamine, dipropylamine, diisopropylamine, dibutylamine, diisobutylamine, bis(2-ethylhexyl)amine, N-methyl- and N-ethylcyclohexylamine and also dicyclohexylamine.

Suitable amines also include any desired aliphatic and cycloaliphatic amines having at least two primary and/or secondary amino groups, for example 1,2-diaminoethane, 1,2-diaminopropane, 1,3-diaminopropane, 1,4-diaminobutane, 1,2-diamino-2-methylpropane, 1,5-diaminopentane, 1,3-diamino-2,2-dimethylpropane, 1,6-diaminohexane, 1,5-diamino-2-methylpentane, 1,6-diamino-2,2,4-trimethylhexane, 1,6-diamino-2,4,4-trimethylhexane, 1,7-diaminoheptane, 1,8-diaminooctane, 2,5-diamino-2,5-dimethylhexane, 1,9-diaminononane, 2-methyl-1,8-diaminooctane, 1,10-diaminodecane, 1,11-diaminoundecane, 1,12-diaminododecane, 1,2-diaminocyclopentane, 1,2-diaminocyclohexane, 1-amino-3,3,5-trimethyl-5-aminomethylcyclohexane (isophoronediamine, IPDA), 3(4)-aminomethyl-1-methylcyclohexylamine, 1,3-diamino and/or -4-methylcyclohexane, isopropyl-2,4- and/or 2,6-diaminocyclohexane, 1,3-bis(aminomethyl)cyclohexane, 1,8-p-diaminomenthane, bis(4-aminocyclohexyl)methane, bis(4-amino-3-methylcyclohexyl)methane, bis(4-amino-3,5-dimethylcyclohexyl)methane, bis(4-amino-2,3,5-trimethylcyclohexyl)methane, 1,1-bis(4-aminocyclohexyl)propane, 2,2-bis(4-aminocyclohexyl)propane, 1,1-bis(4-aminocyclohexyl)ethane, 1,1-bis(4-aminocyclohexyl)butane, 2,2-bis(4-aminocyclohexyl)butane, 1,1-bis(4-amino-3-methylcyclohexyl)ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)propane, 2,2-bis(4-amino-3,5-dimethylcyclohexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane, and 2-(4-amino-cyclohexyl)-2-(4-amino-3-methylcyclohexyl)methane, tetrahydrofurandimethanamine, 3S,3aR,6S,6aR-hexahydrofuro[3,2-b]furan-3,6-diamine, 3R,3aR,6S, 6aR-hexahydrofuro[3,2-b]furan-3,6-diamine, 3S,3aR,6S, 6aR-6-(aminomethyl)-hexahydrofuro[3,2-b furan-3-yl]-methanamine, m-xylylenediamine, methyliminobispropylamine, iminobispropylamine, bis(6-aminohexyl)amine, N,N-bis(3-aminopropyl)ethylenediamine, 4-aminomethyl-1,8-octanediamine, bis(aminopropyl)piperazine, aminoethylpiperazine, diethylenetriamine, dipropylenetriamine, triethylenetetramine, tetraethylenepentamine, pentaethylenehexamine, heptaethyleneoctamine.

Suitable amines further include amino-functional polyalkylene glycols, for example 1,2-bis(aminoethoxy)ethane, 1,11-diamino-3,6,9-trioxaundecane, 1,13-diamino-4,7,10-trioxatridecane and in particular the amine-functionalized polyalkylene glycols having average molecular weights up to 5000, preferably up to 2000, particularly preferably up to 1000, marketed by Huntsman Corp. under the trade name Jeffamine®.

Optionally also employable for producing the compounds A2) are sterically hindered aliphatic diamines having two secondary amino groups, for example the reaction products of aliphatic and/or cycloaliphatic diamines with maleic or fumaric esters disclosed in EP-A 0 403 921, the bisadduct of acrylonitrile with isophoronediamine obtainable according to the teaching of EP-A 1 767 559 or the hydrogenation products of Schiff bases obtainable from aliphatic and/or cycloaliphatic diamines and ketones, for example diisopropyl ketone, described in DE-A 19 701 835 for example.

Suitable polyamines further include the polyamidoamines, polyimines and/or polyvinylamines known as crosslinker components for epoxy resins.

Finally also suitable for producing the polyaddition compounds A2) are amino alcohols, for example 2-aminoethanol, the isomeric aminopropanols and aminobutanols, 3-aminopropane-1,2-diol and 1,3-diamino-2-propanol.

Production of the polyaddition compounds A2) from the isocyanate-functional uretdione-containing compounds A1) employs the recited alcohols and/or amines either individually or as mixtures of at least two such alcohols and/or amines.

Production of the uretdione-containing polyaddition compounds A2) may be carried out by various methods, for example the literature processes for producing polyuretdione compositions such as are described for example in WO 99/11690 and WO 2011/115669.

Optionally also co-usable in addition to the isocyanate-functional uretdione-containing compounds A1) are further monomeric isocyanates of the abovementioned type and/or oligomeric polyisocyanates, preferably those having an isocyanurate, biuret, iminooxadiazinedione, allophanate and/or urethane structure, in an amount of up to 30% by weight based on the total weight of all reaction partners (comprising the isocyanate-functional uretdione-containing compounds A1), alcohols and/or amines).

The reaction is preferably carried out while maintaining an equivalent ratio of isocyanate groups to isocyanurate-reactive groups of 2:1 to 0.5:1, preferably of 1.5:1 to 0.7:1, particularly preferably of 1:1 to 0.9:1.

In a further preferred embodiment the polyaddition compounds A2) are compounds produced by reaction of isocyanate-functional, uretdione-containing compounds A1) with at least difunctional polyols in the molecular weight range 62 to 22 000 and optionally monoalcohols while maintaining an equivalent ratio of isocyanate groups to isocyanurate-reactive groups of 2:1 to 0.5:1.

The reaction may be performed solventlessly or in a suitable solvent inert towards isocyanate groups.

Suitable solvents for producing the polyaddition compounds A2) especially include those inert towards the isocyanate groups of the compound A1), for example the known customary aprotic coatings solvents, for example ethyl acetate, isopropyl acetate, butyl acetate, isobutyl acetate, amyl acetate, 2-ethylhexyl acetate, ethylene glycol monomethyl ether acetate, ethylene glycol monoethyl ether acetate, ethylene glycol monobutyl ether acetate, 1-methoxyprop-2-yl acetate, 3-methoxy-n-butyl acetate, acetone, diethyl ketone, 2-butanone, 4-butyl-2-pentanone, diisobutyl ketone, cyclohexanone, cyclohexane, toluene, xylene, chlorobenzene, dichlorobenzene, petroleum spirit, aromatics having a relatively high degree of substitution, as commercially available, for example, under the Solventnaphtha, Solvesso®, Isopar®, Nappar® (Deutsche EXXON CHEMICAL GmbH, Cologne, DE) and Shellsol® (Deutsche Shell Chemie GmbH, Eschborn, DE) names, but also solvents such as propylene glycol diacetate, diethylene glycol dimethyl ether, dipropylene glycol dimethyl ether, diethylene glycol ethyl and butyl ether acetate, ethyl ethoxypropionate, propylene carbonate, N-methylpyrrolidone and N-methylcaprolactam, dioxane, tetrahydrofuran or any desired mixtures of such solvents.

The reaction of the isocyanate-functional uretdione-containing compounds A1) with the alcohols and/or amines to afford the uretdione-containing polyaddition compounds A2) may be carried out uncatalyzed. However, for the purposes of reaction acceleration it is also possible to employ for example customary catalysts known from polyurethane chemistry. Examples include tertiary amines such as for example triethylamine, tributylamine, dimethylbenzylamine, diethylbenzylamine, pyridine, methylpyridine, dicyclohexylmethylamine, dimethylcyclohexylamine, N,N,N',N'-tetramethyldiaminodiethyl ether, bis(dimethylaminopropyl)urea, N-methyl- or N-ethylmorpholine, N-cocomorpholine, N-cyclohexylmorpholine, N,N,N',N'-tetramethylethylenediamine, N,N,N',N'-tetramethyl-1,3-butanediamine, N,N,N',N'-tetramethyl-1,6-hexanediamine, pentamethyldiethylenetriamine, N-methylpiperidine, N-dimethylaminoethylpiperidine, N,N'-dimethylpiperazine, N-methyl-N'-dimethylaminopiperazine, 1,8-diazabicyclo(5.4.0)undec-7-ene, 1,2-dimethylimidazole, 2-methylimidazole, N,N-dimethylimidazole-β-phenylethylamine, 1,4-diazabicyclo-(2,2,2)-octane, bis(N,N-dimethylaminoethyl) adipate; alkanolamine compounds, for example triethanolamine, triisopropanolamine, N-methyl- and N-ethyldiethanolamine, dimethylaminoethanol, 2-(N,N-dimethylaminoethoxy)ethanol, N,N',N"-tris(dialkylaminoalkyl) hexahydrotriazines, for example N,N',N"-tris (dimethylaminopropyl)-s-hexahydrotriazine and/or bis (dimethylaminoethyl) ether; metal salts, for example inorganic and/or organic compounds of iron, lead, bismuth, zinc and/or tin in customary oxidation states of the metal, for example iron(II) chloride, iron(III) chloride, bismuth(III) acetate, bismuth(III) 2-ethylhexanoate, bismuth(III) octoate, bismuth(III) neodecanoate, zinc chloride, zinc 2-ethylcaproate, tin(II) octoate, tin(II) ethylcaproate, tin(II) palmitate, dibutyltin(IV) dilaurate (DBTL), dibutydilauryltin mercaptide or lead octoate; amidines, for example 2,3-dimethyl-3,4,5,6-tetrahydropyrimidine; tetraalkylammonium hydroxides, for example tetramethylammonium hydroxide; alkali metal hydroxides, for example sodium hydroxide; alkali metal alkoxides, for example sodium methoxide and potassium isopropoxide, and alkali metal salts of long-chain fatty acids having 10 to 20 carbon atoms and optionally pendant OH groups.

Preferred catalysts are tertiary amines, bismuth and tin compounds of the type mentioned.

Independently of their mode of production the uretdione-containing polyaddition compounds A2) in solvent-free form in a preferred embodiment have a content of free isocyanate groups of less than 5% by weight, preferably of less than 2% by weight and particularly preferably of less than 1% by weight. Isocyanate-free polyaddition compounds A2) are very particularly preferred.

In the compositions according to the invention the uretdione-comprising component A) is combined with a component B) comprising at least one hydroxyl group as a reaction partner.

The component B) is for example selected from the compounds recited as suitable alcohols hereinabove for the production of the polyaddition compound A2), in particular at least difunctional polyols of the molecular weight range 62 to 22 000.

Suitable hydroxy-functional components B) are preferably the abovementioned simple polyhdric alcohols having 2 to 14 carbon atoms, low molecular weight ether and ester alcohols and the customary polymeric polyether polyols, polyester polyols, polycarbonate polyols and/or polyacrylate polyols known from polyurethane chemistry.

In a further preferred embodiment the compositions according to the invention to employ the at least one component A) comprising at least one uretdione group and the at least one component B) comprising at least one hydroxyl group in amounts such that for each uretdione group of the component A) there are 0.5 to 2.0, preferably 0.7 to 1.5, particularly preferably 0.8 to 1.2, very particularly preferably precisely one, hydroxyl groups of the component B).

To accelerate the reaction between the uretdione groups of the component A) and the hydroxyl groups of the component B) the compositions according to the invention employ a combination of at least one salt-type catalyst C1) with a catalyst C2) containing an imidazolium and/or imidazolinium cation and at least one N,N,N'-trisubstituted amidine structure.

Compounds suitable as catalysts C1) are known as imidazolium- and imidazolinium-type ionic liquids and are employed for example as solvents in chemical synthesis. Processes for their production are described, for example, in Chem. Rev. 99, 8, 2071-2084 and WO 2005/070896.

The catalysts C1) are salt-type compounds containing a structural element of general formulae (I) or (II)

(I)

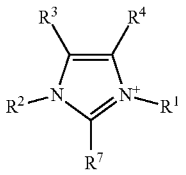

(II)

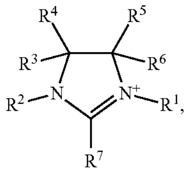

in which $R^1$, $R^2$, $R^3$, $R^4$, $R^5$ and $R^6$ independently of one another stand for identical or different radicals which represent saturated or unsaturated, linear or branched, aliphatic, cycloaliphatic, araliphatic or aromatic organic radicals having 1 to 18 carbon atoms, which are substituted or unsubstituted and/or have heteroatoms in the chain, wherein the radicals may also in combination with one another and optionally with a further heteroatom form rings having 3 to 8 carbon atoms which may optionally be further substituted, $R^3$, $R^4$, $R^5$ and $R^6$ may independently of one another also represent hydrogen and $R^7$ represents hydrogen or a carboxylate anion ($COO^-$).

Preferred catalysts C1) are salt-type compounds containing a structural element of general formulae (I) or (II), in which $R^1$ and $R^2$ independently of one another stand for identical or different radicals which represent saturated or unsaturated, linear or branched, aliphatic, cycloaliphatic, araliphatic or aromatic organic radicals which have 1 to 12 carbon atoms, are substituted or unsubstituted and/or have heteroatoms in the chain, $R^3$, $R^4$, $R^5$ and $R^6$ represent hydrogen and wherein $R^7$ represents hydrogen or a carboxylate anion ($COO^-$).

Particularly preferred catalysts C1) are salt-type compounds containing a structural element of general formulae (I) or (II), in which $R^1$ and $R^2$ independently of one another stand for identical or different radicals which represent saturated or unsaturated, linear or branched, aliphatic organic radicals having 1 to 12 carbon atoms, $R^3$, $R^4$, $R^5$ and $R^6$ represent hydrogen and $R^7$ represents hydrogen or a carboxylate anion ($COO^-$).

Suitable catalysts of general formula (I) include for example those containing a cation selected from 1,3-dimethylimidazolium, 1-methyl-3-ethylimidazolium, 1-methyl propylimidazolium, 1-methyl-3-butylimidazolium, 1-methyl-3-pentylimidazolium, 1-methyl-3-hexylimidazolium, 1-methyl-3-octylimidazolium, 1-methyl-3-nonylimidazolium, 1-methyl-3-decylimidazolium, 1-decyl-3-methylimidazolium, 1-methyl-3-benzylimidazolium, 1-methyl-3-(3-phenylpropyl)imidazolium, 1-ethyl-3-methylimidazolium (EMIM), 1-isopropyl-3-methylimidazolium, 1-butyl-3-methylimidazolium (BMIM), 1-hexyl-3-methylimidazolium, 1-heptyl-3-methylimidazolium, 1-(2-ethyl)hexyl-3-methylimidazolium (OM IM), 1,3-bis(tert-butyl)imidazolium, 1,3-bis(2,4,6-trimethylphenyl)imidazolium or 1,3-dimethylbenzimidazolium.

Suitable catalysts of general formula (II) include for example those containing a cation selected from 1,3-dimethylimidazolinium, 1-ethyl-3-methylimidazolinium, 1-butyl-3-methylimidazolium-1,3-bis-(2,6-diisopropylphenyl)imidazolinium or 1,3-bis(2,4,6-trimethylphenyl)imidazolinium-1-(1-adamantyl)-3-(2,4,6-trimethylphenyl)imidazolinium, 1,3-diphenyl-4,4,5,5-tetramethylimidazolinium, 1,3-di-o-tolyl-4,4,5,5-tetramethylimidazolinium.

As a counterion to the imidazolium and imidazolinium cations the catalysts C1) present in the compositions according to the invention contain any inorganic and/or organic anions such as for example halide, sulfate, hydroxysulfate, sulfite, nitrate, carbonate, hydrogencarbonate, arylsulfonate, alkylsulfonate, trifluoromethylsulfonate, alkylsulfate, phosphate, dialkylphosphate, hexafluorophosphate, trifluoromethylborate, tetrafluoroborate, bis(trifluoromethylsulfonyl) imide, dicyanamide and/or carboxylate anions.

The counterion to the imidazolium and imidazolinium cations may in addition also be a carboxylate group ($COO^-$)

bonded directly to the imidazolium cation as $R^7$ of general formula (I), wherein the catalyst C1) is in this case in the form of a zwitterionic structure.

Suitable catalysts C1) for the compositions according to the invention include for example 1,3-dimethylimidazolium chloride, 1,3-dimethylimidazolium 2-carboxylate, 1,3-dimethylimidazolium dimethylphosphate, 1-ethyl-3-methylimidazolium chloride, 1-ethyl-3-methylimidazolium bromide, 1-ethyl-3-methylimidazolium iodide, 1-ethyl-3-methylimidazolium nitrate, 1-ethyl-3-methylimidazolium hydrogencarbonate, 1-ethyl-3-methylimidazolium methanesulfonate, 1-ethyl-3-methylimidazolium trifluoromethanesulfonate, 1-ethyl-3-methylimidazolium trifluoro(trifluoromethyl)borate, 1-ethyl-3-methylimidazolium hydrogensulfate, 1-ethyl-3-methylimidazolium ethylsulfate, 1-ethyl-3-methylimidazolium dicyanamide, 1-ethyl-3-methylimidazolium tetrafluoroborate, 1-ethyl-3-methylimidazolium diethylphosphate, 1-ethyl-3-methylimidazolium hexafluorophosphate, 1-ethyl-3-methylimidazolium bis(trifluoromethanesulfonyl)imide, 1-ethyl-3-methylimidazolium 2-carboxylate, 1-ethyl-3-methylimidazolium acetate, 1-ethyl methylimidazolium pivalate, 1-ethyl-3-methylimidazolium (L)-(+)-lactate, 1-methyl propylimidazolium iodide, 1,3-diisopropyl-4,5-dimethylimidazolium 2-carboxylate, 1-butyl methylimidazolium chloride, 1-butyl-3-methylimidazolium bromide, 1-butyl methylimidazolium iodide, 1-butyl-3-methylimidazolium trifluoromethanesulfonate, 1-butyl-3-methylimidazolium ethylsulfate, 1-butyl-3-methylimidazolium n-octylsulfate, 1-butyl-3-methylimidazolium dicyanamide, 1-butyl-3-methylimidazolium trifluoro(trifluoromethyl)borate, 1-butyl-3-methylimidazolium tetrafluoroborate, 1-butyl-3-methylimidazolium dibutylphosphate, 1-butyl-3-methylimidazolium hexafluorophosphate, 1-butyl-3-methylimidazolium 2-carboxylate, 1-butyl-3-methylimidazolium acetate, butyl-3-methylimidazolium pivalate, 1-butyl-3-methylimidazolium bis(trifluoromethanesulfonyl)imide, bis(tert-butyl)imidazolium 2-carboxylate, 1-hexyl-3-methylimidazolium chloride, 1-hexyl-3-methylimidazolium bromide, 1-hexyl-3-methylimidazolium tetrafluoroborate, 1-hexyl-3-methylimidazolium bis(trifluoromethanesulfonyl)imide, 1-hexyl-3-methylimidazolium hexafluorophosphate, 1-methyl-3-n-octylimidazolium bromide, 1-methyl-3-n-octylimidazolium chloride, 1-methyl-3-n-octylimidazolium hexafluorophosphate, 1-decyl-3-methylimidazolium bis(trifluoromethansulfonyl)imide, 1,3-dimethylimidazolinium chloride, 1,3-dimethylimidazolinium 2-carboxylate, 1,3-dimethylimidazolinium acetate, 1-ethyl-3-methylimidazolinium chloride, 1-ethyl-3-methylimidazolinium 2-carboxylate, 1-ethyl-3-methylimidazolinium acetate, 1-butyl-3-methylimidazolinium 2-carboxylate, 1,3-bis(2,6-diisopropylphenyl)imidazoliniumchloride or 1,3-bis(2,4,6-trimethylphenyl)imidazolinium-1-(1-adamantyl)-3-(2,4,6-trimethylphenyl)imidazolinium chloride and/or 1,3-diphenyl-4,4,5,5-tetramethylimidazolinium chloride.

Particularly preferred catalysts C1) are imidazolium salts of the recited type with carboxylate anions, very particularly preferably 1,3-dimethylimidazolium 2-carboxylate, 1-ethyl-3-methylimidazolium 2-carboxylate, 1-ethyl-3-methylimidazolium acetate, 1-ethyl-3-methylimidazolium pivalate, 1-butyl-3-methylimidazolium 2-carboxylate and/or 1-butyl-3-methylimidazolium acetate.

The catalysts C2) are compounds containing N,N,N'-trisubstituted amidine structures having a content of amidine groups (calculated as $CN_2$; molecular weight=40) of 12.0% to 47.0% by weight, preferably from 15.0% to 40.0% by weight. Suitable catalysts C2) are any desired optionally substituted alkyl-, aralkyl- or aryl-bearing amidine bases, wherein the CN double bond of the amidine structure may be part of an open-chain molecule or else a constituent of a cyclic or bicyclic system or be arranged exocyclically on a ring system, or any desired mixtures of such amidines.

Suitable amidine catalysts C2) in which the CN double bond is part of an open-chain molecule include for example N,N-dimethyl-N'-phenylformamidine or N,N,N'-trimethylformamidine, the production of which is described, for example, in Chem Ber. 98, 1078 (1965). Examples of suitable amidines C2) in which the CN double bond is a constituent of a cyclic system include 2-methyltetrahydropyrimidines substituted in the 1-position, such as are obtainable for example according to the teaching of DE-A 2 439 550 by reaction of N-monosubstituted 1,3-propanediamines with acetoacetic acid derivatives, or monocyclic amidine bases, such as are obtainable according to DE-A 1 078 568 by reaction of carbamoyl chlorides formed from secondary amines with lactams. Suitable catalysts C2) where the CN double bond is arranged exocyclically on a ring system include for example imines of N-alkyl-substituted lactams, such as 2-methylimino-1-methylpyrrolidone, the production of which is described for example in Chem. Ber. 101, 3002 (1968).

However, preferred catalysts C2) are bicyclic catalysts containing N,N,N'-trisubstituted amidine structures of general formula (III)

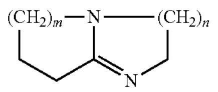

(III)

in which m is an integer from 1 to 9, preferably from 1 to 3, and n is an integer from 1 to 3, preferably 2.

The production of such bicyclic amidines is known and is described, for example, in DE-A 1545855 or in EP-A 662 476. Particularly preferred catalysts C2) for the process according to the invention are 1,5-diazabicyclo[4.3.0]non-5-ene (DBN) and 1,8-diazabicyclo[5.4.0]undec-7-ene (DBU).

In the compositions according to the invention the catalysts 01) are always employed together with catalysts C2), wherein the catalysts 01) and catalysts C2) may in each case be either individual compounds 01) and C2) of the abovementioned type or any desired mixtures of at least two such catalysts 01) or C2). The amount of the catalysts 01) and C2) in the compositions according to the invention is for each individual catalyst component 01) and C2) in each case from 0.0005% to 5% by weight, preferably 0.0025% to 4% by weight, particularly preferably 0.005% to 2.5% by weight, very particularly preferably 0.05% to 0.5%, based on the total weight of the components A) and B), excluding any solvents, auxiliaries or additives present in these components.

Accordingly, the total amount of catalysts 01) and C2) in the compositions according to the invention may be from 0.001% to 10% by weight, preferably 0.005% to 8% by weight, particularly preferably 0.01% to 5% by weight, very particularly preferably 0.1% to 1%, based on the total weight of the components A) and B), excluding any solvents, auxiliaries or additives present in these components.

The compositions according to the invention are exceptionally suitable for producing polyurethane plastics and are used therefor. The compositions according to the invention are preferably used for producing coating formulations.

The present invention therefore likewise provides coating formulations containing at least one at least one component A) comprising at least one uretdione group, at least one component B) comprising at least one hydroxyl group, at least one catalyst C1) having an imidazolium or imidazolinium structure and at least one catalyst C2) having an amidine structure and optionally further auxiliaries and additives.

The curing of the compositions according to the invention is carried out according to the activity of the employed catalyst generally in the temperature range of 20° C. to 200° C., preferably of 60° C. to 180° C., particularly preferably of 70° C. to 160° C. and very particularly preferably of 80° C. to 140° C., by preference over a period of 1 minute to 12 hours, preferably 10 minutes to 3 hours.

Under these conditions the uretdione groups originally present in component A) generally undergo complete reaction to form allophanate groups and optionally isocyanurate groups.

The present invention further provides for the use of at least one composition according to the invention for producing polyurethane plastics. In addition, the present invention further provides for the use of at least one composition according to the invention for producing coating formulations.

Substrates contemplated for the coatings formulated using the compositions according to the invention include any desired substrates, for example, metal, wood, glass, stone, ceramic materials, concrete, rigid and flexible plastics, textiles, leather, and paper, which prior to coating may optionally also be provided with customary primers.

The present invention further provides coating formulations containing at least one composition according to the invention and a substrate coated with an optionally heat-cured coating formulation according to the invention.

The coating formulations formulated with the compositions according to the invention which may optionally be admixed with the customary auxiliary and additive substances known to those skilled in the art, for example solvents, UV stabilizers, antioxidants, flow control agents, rheological additives, slip additives, dyes, matting agents, flame retardants, hydrolysis inhibitors, microbicides, algicides, water scavengers, thixotropic agents, wetting agents, deaerating agents, adhesion promoters, fillers and/or pigments, afford films having good coatings properties under the recited curing conditions.

The invention likewise provides polyurethane plastics, preferably coatings, obtained by using the abovedescribed coating formulations.

EXAMPLES

All percentages are based on weight unless otherwise stated.

NCO contents were determined titrimetrically according to DIN EN ISO 11909:2007-05.

All viscosity measurements were recorded with a Physica MCR 51 rheometer from Anton Paar Germany GmbH (DE) according to DIN EN ISO 3219:1994-10 at a shear rate 5 of 250 s-1.

Residual monomer contents were measured in accordance with DIN EN ISO 10283:2007-11 by gas chromatography with internal standard.

The compositions of the HDI-uretdione polyisocyanate were determined by gel permeation chromatography on the basis of DIN 55672-1:2016-03 (gel permeation chromatography (GPC)—part 1: tetrahydrofuran (THF) as eluent) with the modification that a flow rate of 0.6 ml/min rather than 1.0 ml/min was used. The proportions of the different oligomers from the chromatograms in area % which were determined by software assistance were in each case approximately equated with proportions in % by weight.

König pendulum damping was determined in accordance with DIN EN ISO 1522:2007-04 on glass plates.

The microhardness (surface hardness/Martens hardness at a test force of 0.6 mN) and the elastic deformation component of the coatings films were measured using a Fischerscope HM 2000 instrument according to DIN EN ISO 14577-1:2015-11.

Appearance measurements were carried out using a “Wave Scan” instrument from BYK-Gardner GmbH, Geretsried, DE. Values for dullness (the smaller the value, the less matt) and distinctness of image DOI (the larger the value, the higher the brilliance) are in each case reported as average values from five individual measurements.

Solvent resistance was determined using xylene as a typical coatings solvent. To this end a small amount of the solvent was added to a test tube and provided with a cotton pad at the opening so that an atmosphere saturated with xylene was formed inside the test tube. The test tube was subsequently placed with the cotton pad on the coating surface and remained there for 5 minutes. Once the solvent had been wiped off, the film was examined for destruction/softening/loss of adhesion. (0=no change, 5=film destroyed)

Starting Compounds

Production of an HDI Polyuretdione Crosslinker

According to the process described in example 1 of EP-A 0 789 017 1,3-bis(6-isocyanatohexyl)-1,3-diazetidin-2,4-dione (ideal bis(6-isocyanatohexyl)uretdione) was produced by tributylphosphine-catalyzed oligomerization of 1,6-diisocyanatohexane (HDI) and subsequent distillative workup.

NCO content: 25.0%

Monomeric HDI: <0.03%

Viscosity (23° C.): 28 mPas

Analysis by gel permeation chromatography (GPC) reveals the following composition:

| | | |
|---|---|---|
| HDI uretdione (n = 2): | 99.2% | (according to GPC) |
| HDI isocyanurat (n = 3): | 0.4% | (according to GPC) |
| higher oligomers: | 0.4% | (according to GPC) |

1000 g (5.95 eq) of this ideal bis(6-isocyanatohexyl) uretdione (NCO content: 25.0%) were dissolved in 800 g of butyl acetate, 4.6 g (0.2% by weight) of a 10% solution of dibutyltin dilaurate (DBTL) in butyl acetate were added and the mixture was heated to 80° C. under dry nitrogen and with stirring. A mixture of 347.5 g (4.76 eq) of 2,2,4-trimethylpentane-1,3-diol and 154.7 g (1.19 eq) of 2-ethyl-1-hexanol was added dropwise to this solution over 2 hours. After a stirring time of 16 hours at 80° C. the NCO content was <0.2%. A practically colorless solution of an HDI polyurethane crosslinker (HDI-UD2) was obtained.

NCO content: 0.16%

Uretdione group content: 10.8% (calculated as $C_2N_2O_2$, molecular weight 84)

Uretdione functionality: 5 (calculated)

Solids content: about 65%

Viscosity (23° C.): 1400 mPas

Catalysts C1)

1-Ethyl-3-methylimidazolium acetate (97%), Sigma-Aldrich Chemie GmbH, Munich, DE 1-Ethyl-3-methylimidazolium pivalate produced according to the process described in RSC Advances, 2019, Vol. 9, 4048-4053 by D. Hirose, S. B. Wardhana Kusuma, S. Nomura, M. Yamaguchi, Y. Yasaka, R. Kakuchi and K. Takahashi.

Catalyst C2)

1,8-Diazabicyclo[5.4.0]undec-7-ene, DBU (98%), Sigma-Aldrich Chemie GmbH, Munich, DE Examples 1 to 5 (Inventive and Comparative)

In each case 2.5 g (0.014 eq) of a commercially available, aromatics-free branched polyester polyol having a solids content of 75% in butyl acetate and an OH content of 9.5% based on solid resin, obtainable under the name Desmophen® 775 (Covestro Deutschland AG, Leverkusen, DE), were mixed with 10.4 g (0.014 eq) of the above-described HDI polyuretdione crosslinker corresponding to an equivalent ratio of hydroxyl groups to uretdione groups of 1:1 to afford a coating formulation and after addition of a catalyst component was applied to a degreased glass sheet using a film applicator in an applied film thickness of 180 μm.

After flashing off at room temperature for 5 minutes the coatings were cured at 100° C. over 30 min. In all cases completely transparent coatings were obtained.

The table below shows the type and amount of the catalysts added in each case and the coatings performance properties of the coatings obtained.

| | 1 | 2 Comparative | 3 Comparative | 4 | 5 Comparative |
|---|---|---|---|---|---|
| EMIM pivalate [mg]/[mmol] | 50/0.23 | 50/0.23 | — | — | — |
| EMIM acetate [mg]/[mmol] | — | — | — | 50/0.29 | 50/0.29 |
| DBU [mg][mmol] | 44/0.28 | — | 44/0.28 | 44/0.28 | — |
| Flow visual assessment | good | Structure | good | very good | good |
| Color | colorless | colorless | yellow | colorless | colorless |
| Dullness | 43.9 | n.m. | 38.2 | n.d. | n.d. |
| DOI | 66.8 | n.m. | 72.1 | n.d. | n.d. |
| Pendulum damping [s] | 188 | 90 | 79 | 186 | 103 |
| Martens hardness [N/mm2] (0.6 mN) | 154.15 | 216.28 | 35.29 | n.d. | n.d. |
| Elastic deformation component nIT [%] | 30.73 | 39.65 | 0.62 | n.d. | n.d. |
| Xylene resistance | 0 | 0 | 5 | 0 | 2 |

n.m.: not measurable
n.d.: not determined

The comparison shows that the coating of inventive example 1 cures to give a fully crosslinked, hard coating having good optical properties. Although the coatings film from comparative example 3 has slightly better flow properties, it exhibits severe yellow discoloration. The low values for pendulum damping and microhardness and the very poor xylene resistance indicate that the system from comparative example 3 catalyzed exclusively with DBU does not crosslink under the selected curing conditions. The high hardness and good solvent resistance of the coatings film obtained according to comparative example 2 show that this too is fully crosslinked. However, the film surface is so severely structured that values for optical appearance were not able to be measured. The coatings film from comparative example 5, catalyzed exclusively with an imidazolium salt, has a markedly lower pendulum hardness and a lower xylene resistance than coatings 1 and 4 produced according to the invention.

The invention claimed is:

1. A composition comprising:

A) at least one component comprising at least one uretdione group,

B) at least one component comprising at least one hydroxyl group,

C1) at least one catalyst comprising a structural element of general formulae (I) and/or (II)

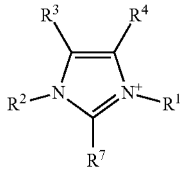

(I)

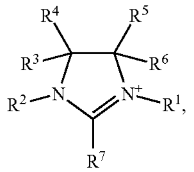

(II)

in which $R^1$, $R^2$, $R^3$, $R^4$, $R^5$ and $R^6$ independently of one another stand for identical or different radicals which represent saturated or unsaturated, linear or branched, aliphatic, cycloaliphatic, araliphatic or aromatic organic radicals having 1 to 18 carbon atoms which are substituted or unsubstituted and/or have heteroatoms in the chain, wherein the radicals optionally in combination with one another and optionally with a further heteroatom form rings having 3 to 8 carbon atoms which optionally are further substituted, wherein $R^3$, $R^4$, $R^5$ and $R^6$ optionally independently of one another also represent hydrogen and $R^7$ represents hydrogen or a carboxylate anion (COO), and C2) at least one catalyst comprising at least one N,N,N'-trisubstituted amidine structure and having an amidine group content (calculated as $CN_2$; molecular weight=40) of 12.0% to 47.0% by weight.

2. The composition of claim 1, wherein component A) is selected from isocyanate-functional uretdione-containing compounds A1) or polyaddition compounds A2) obtainable by reaction of isocyanate-functional uretdione-containing compounds A1) with alcohols or amines.

3. The composition of claim 2, wherein component A1) is selected from uretdione-containing compounds based on PDI, HDI, IPDI, XDI, NBDI or $H_{12}$-MDI.

4. The composition of claim 2, wherein polyaddition compounds A2) are selected from compounds which are produced by reaction of isocyanate-functional, uretdione-containing compounds A1) with at least difunctional polyols in the molecular weight range 62 to 22 000 and optionally monoalcohols while maintaining an equivalent ratio of isocyanate groups to isocyanurate-reactive groups of 2:1 to 0.5:1 and in solvent-free form have a content of free isocyanate groups of less than 5% by weight.

5. The composition of claim 1, wherein component B) is selected from at least difunctional polyols in the molecular weight range 62 to 22 000.

6. The composition of claim 1, wherein components A) and B) are present in amounts such that for each uretdione group of the component A) there are 0.5 to 2.0 hydroxyl groups of the component B).

7. The composition of claim 1, wherein component C1) is selected from catalysts containing a structural element of general formulae (I) or (II), in which $R^1$ and $R^2$ independently of one another stand for identical or different radicals which represent saturated or unsaturated, linear or branched, aliphatic, cycloaliphatic, araliphatic or aromatic organic radicals which have 1 to 12 carbon atoms, are substituted or unsubstituted and/or have heteroatoms in the chain, $R^3$, $R^4$, $R^5$ and $R^6$ represent hydrogen and wherein $R^7$ represents hydrogen or a carboxylate anion ($COO^-$).

8. The composition of claim 1, wherein catalyst C1) is selected from imidazolium salts of general formulae (I) and/or (II) with carboxylate anions.

9. The composition of claim 1, wherein catalyst C2) is selected from bicyclic catalysts containing N,N,N'-trisubstituted amidine structures of general formula (III)

(III)

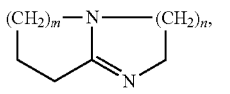

in which m is an integer from 1 to 9 and n is an integer from 1 to 3.

10. The composition of claim 1, wherein catalyst C2) is 1,5-diazabicyclo[4.3.0]non-5-ene (DBN) or 1,8-diazabicyclo[5.4.0]undec-7-ene (DBU).

11. The composition of claim 1, wherein catalysts C1) and C2) are each present in an amount of 0.0005% to 5% by weight, based on the total weight of the components A) and B), excluding any solvents, auxiliaries or additives present in these components.

12. A coating formulation comprising the composition of claim 1.

13. A substrate coated with a heat-cured coating formulation of claim 12.

14. A polyurethane plastic produced from the composition of claim 1.

15. The composition of claim 2, wherein component A1) is selected from uretdione-containing compounds based on PDI, HDI, IPDI, XDI, NBDI or $H_{12}$-MDI which have an average NCO functionality of at least 1.6.

16. The composition of claim 2, wherein component A1) is selected from uretdione-containing compounds based on PDI, HDI, IPDI, XDI, NBDI or $H_{12}$-MDI which have a content of uretdione structures (calculated as $C_2N_2O_2$, molecular weight=84) of 10% to 25% by weight.

17. The composition of claim 1, wherein catalyst C1) is selected from the group consisting of 1,3-dimethylimidazolium 2-carboxylate, 1-ethyl-3-methylimidazolium 2-carboxylate, 1-ethyl-3-methylimidazolium acetate, 1-butyl-3-methylimidazolium 2-carboxylate, 1-ethyl-3-methylimidazolium pivalate and 1-butyl-3-methylimidazolium acetate.

18. The composition of claim 1, wherein catalysts C1) and C2) are each present in an amount of 0.0025% to 4% by weight, based on the total weight of the components A) and B), excluding any solvents, auxiliaries or additives present in these components.

19. The composition of claim 1, wherein catalysts C1) and C2) are each present in an amount of 0.005% to 2.5% by weight, based on the total weight of the components A) and B), excluding any solvents, auxiliaries or additives present in these components.

20. The composition of claim 1, wherein catalysts C1) and C2) are each present in an amount of 0.05% to 0.5%, based on the total weight of the components A) and B), excluding any solvents, auxiliaries or additives present in these components.

* * * * *